United States Patent
Huang et al.

(10) Patent No.: US 8,232,972 B2
(45) Date of Patent: Jul. 31, 2012

(54) TOUCH POSITION DETECTOR OF CAPACITIVE TOUCH PANEL AND METHOD FOR DETECTING THE TOUCH POSITION

(75) Inventors: Chun-Chung Huang, Hsinchu (TW); Tsun-Min Wang, Changhua (TW); Chun-Yu Lin, Daya Township, Taichung County (TW); Tse-Chi Lin, Yonghe (TW)

(73) Assignee: Elan Microelectronics Corporation, Hsin-Chu (TW)

( * ) Notice: Subject to any disclaimer, the term of this patent is extended or adjusted under 35 U.S.C. 154(b) by 1095 days.

(21) Appl. No.: 11/971,788

(22) Filed: Jan. 9, 2008

(65) Prior Publication Data

US 2009/0032312 A1 Feb. 5, 2009

(30) Foreign Application Priority Data

Jul. 31, 2007 (TW) .............................. 96128001 A

(51) Int. Cl.
*G06F 3/041* (2006.01)
(52) U.S. Cl. ...................................... 345/173; 345/174
(58) Field of Classification Search ........... 345/173–179
See application file for complete search history.

(56) References Cited

U.S. PATENT DOCUMENTS

| | | | | |
|---|---|---|---|---|
| 5,442,347 | A * | 8/1995 | Vranish | 340/870.37 |
| 5,920,309 | A * | 7/1999 | Bisset et al. | 345/173 |
| 6,246,394 | B1 * | 6/2001 | Kalthoff et al. | 345/173 |
| 6,738,048 | B1 * | 5/2004 | Rundel | 345/173 |
| 2004/0227735 | A1 * | 11/2004 | Pratt et al. | 345/173 |
| 2006/0097991 | A1 * | 5/2006 | Hotelling et al. | 345/173 |
| 2007/0032967 | A1 * | 2/2007 | Feen et al. | 702/47 |
| 2007/0070049 | A1 * | 3/2007 | Lee et al. | 345/173 |
| 2007/0074913 | A1 * | 4/2007 | Geaghan et al. | 178/18.06 |
| 2007/0079996 | A1 * | 4/2007 | Lee et al. | 178/18.06 |
| 2007/0257890 | A1 * | 11/2007 | Hotelling et al. | 345/173 |
| 2007/0262966 | A1 * | 11/2007 | Nishimura et al. | 345/173 |
| 2007/0268272 | A1 * | 11/2007 | Perski et al. | 345/173 |
| 2008/0047764 | A1 * | 2/2008 | Lee et al. | 178/18.06 |
| 2008/0111714 | A1 * | 5/2008 | Kremin | 341/33 |
| 2008/0158175 | A1 * | 7/2008 | Hotelling et al. | 345/173 |

* cited by examiner

*Primary Examiner* — Bipin Shalwala
*Assistant Examiner* — Nelson Lam
(74) *Attorney, Agent, or Firm* — Muncy, Geissler, Olds & Lowe, PLLC

(57) ABSTRACT

A touch position detector includes a plurality of capacitance sensors, a negative capacitance compensation unit, an analog/digital converter and a micro processing unit. The negative capacitance compensation unit is utilized to compensate the capacitance of the capacitance sensor and get a capacitance change. The micro controller unit is utilized to detect the touch position according to the capacitance change. It is easy to get the touch position by using the touch position detector.

7 Claims, 8 Drawing Sheets

TOUCH POSITION DETECTOR OF CAPACITIVE TOUCH PANEL AND METHOD FOR DETECTING THE TOUCH POSITION

BACKGROUND

1. Field of the Invention

The present invention relates to a capacitive touch panel, more particularly to a touch position detector of a capacitive touch panel and a method for detecting the touch position.

2. Background of the Invention

Nowadays, touch panel has been widely used in electronic device such as personal computer and mobile phone. As a kind of touch panel, capacitive touch panel has been used more widely.

The conventional capacitive touch panel includes a plurality of capacitive sensors, each of which has a basic capacitance. When an object, such as a finger, is touching on the capacitive touch panel, the capacitance of the capacitive sensor located at the touch position is changed. Then the capacitances of the capacitive sensors are measured and converted to digital signals by an analog/digital converter (ADC). So the touch position is detected according to the change of the capacitance. However, the basic capacitance is usually much more than the change of the capacitance, resulting in the basic capacitance can't be correctly compensated and be precisely read after being converted by the ADC. When the capacitances of the capacitive sensors are not uniform, the ADC will have seriously direct current (DC) shifts and different signals which make the touch position is hard to detect.

BRIEF SUMMARY

According, an object of the present invention is to provide a touch position detector of a capacitive touch panel, which is capable of eliminating the influence of the basic capacitance on the analog to digital converter.

Another object of the present invention is to provide a method for detecting a touch position of a capacitive touch panel, which is no need to use a complicated algorithm to detect the touch position and makes the detecting process easier.

According to the above objects, the present invention provides a touch position detector of a capacitive touch panel which comprises a plurality of capacitive sensors for sensing a touch object, a negative capacitance compensation unit coupled to the capacitive sensors for compensating the basic capacitance of the capacitive sensor and obtaining the change of the capacitance, an analog/digital converter (ADC) coupled to the negative capacitance compensation unit for converting the change of the capacitance to a digital signal and a micro controller unit coupled to ADC for calculating the touch position of the touch object according to the change of the digital capacitance.

The present invention also provides a method for detecting a touch position of touch panel, the method comprises steps of: setting an initial value for a capacitive sensor; inputting a negative capacitance compensation parameter and a capacitance gain parameter of a channel; measuring the capacitance of the channel; and detecting the touch position according to the capacitance of the channel.

According to the above invention, the touch position detector uses the negative capacitance compensation unit to compensate the basic capacitance. Therefore, the influence of the basic capacitance on the ADC is eliminated. It is not necessary to use a complicated algorithm to detect the touch position and makes the detecting process easier.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
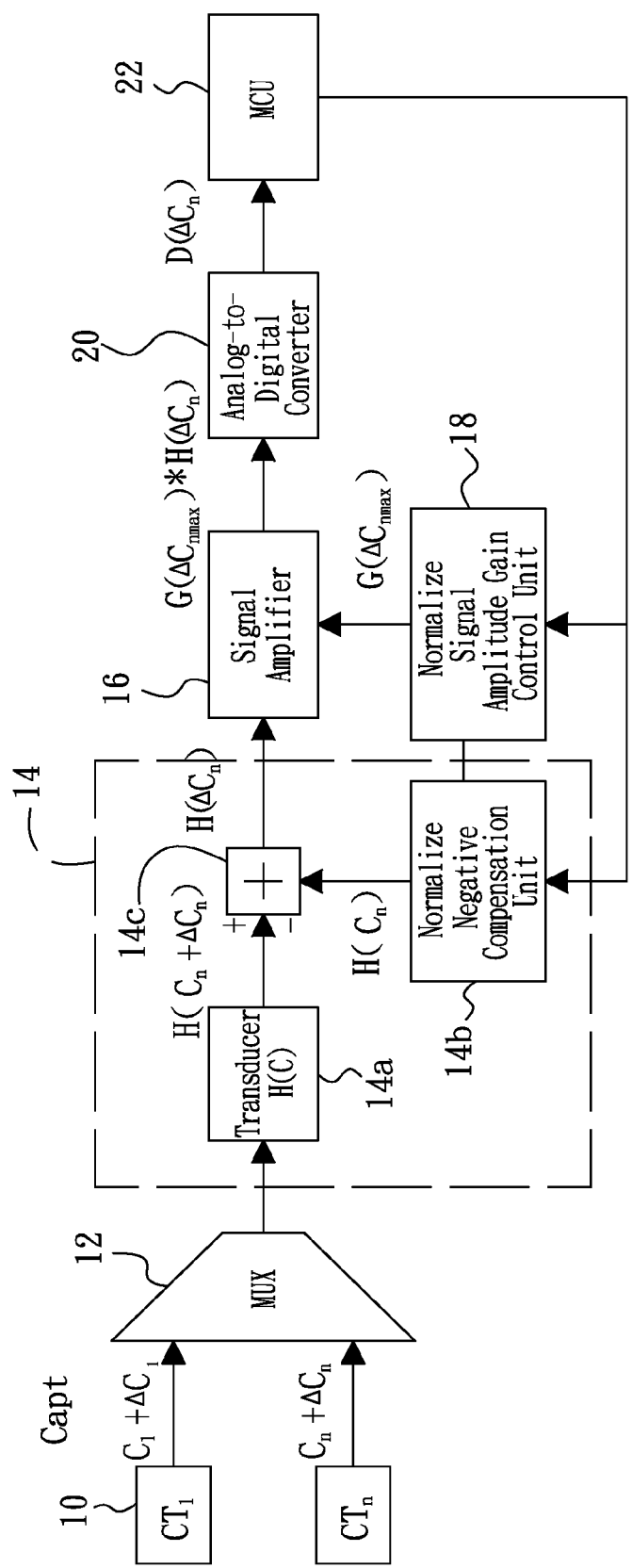
FIG. 1 is a schematic block diagram of the touch position detector of capacitive touch panel according to the present invention.

FIG. 1 is a schematic block diagram of the touch position detector of capacitive touch panel according to the present invention. The touch position detector comprises a plurality of capacitive sensors 10, a multiplexer (MUX) 12, a negative capacitance compensation unit 14, a signal amplifier 16, a normalized signal amplitude gain controller 18, an analog to digital converter (ADC) 20 and a micro controller unit (MCU) 22.

The capacitive sensor 10 is the capacitance sensing unit of capacitive touch panel. It is used to sense a capacitance $C_n + \Delta C_n$ corresponding to the touch position, wherein $C_n$ denotes the basic capacitance and $\Delta C_n$ denotes the gain of the capacitance. The plurality of capacitive sensors 10 are arranged in an array or other shape in the capacitive touch panel.

The multiplexer 12 is coupled between the capacitive sensor 10 and the negative capacitance compensation unit 14 for controlling the connection between the capacitive sensor 10 and the negative capacitance compensation unit 14. The multiplexer 12 can be a single channel multiplexer or a multi-channel multiplexer.

The negative capacitance compensation unit 14 is coupled to the multiplexer 12 for compensating the basic capacitance of the capacitive sensor 10 in detection operation and then obtains the change of the capacitance. In this embodiment, the negative capacitance compensation unit 14 comprises a transducer 14a, a normalized negative compensation unit 14b, and an adder 14c. The transducer 14a transforms a sensed capacitance $C_n$ to a measuring signal $H(C_n + \Delta C_n)$, wherein H is a function related to $C_n + \Delta C_n$ in the form of the value of electronic charge, voltage, current or frequency. The normalized negative compensation unit 14b generates a corresponding feedback signal $-H(C_n)$ according to the capacitive sensor 10. Then the measuring signal $H(C_n + \Delta C_n)$ adds to the feedback signal $-H(C_n)$ in the adder 14c to generate the gain of the capacitance of the capacitive sensor 10 $H(\Delta C_n)$.

The signal amplifier 16 is coupled to the adder 14c. It amplifies the output signal of the negative capacitance compensation unit 14 to provide an optimized signal to the ADC 20. The gain of the signal amplifier 16 can be adjustable.

The normalized signal amplitude gain controller 18 is coupled between the signal amplifier 16 and the MCU 22 to generate a corresponding signal back according to the largest signal strength from loading object so that the ADC 20 outputs the identical digital signal when all the channel and the contact areas of the sensors 10 are the same.

The ADC 20 is coupled to the signal amplifier 16 to convert the output signal of the signal amplifier 16 to a digital signal.

The MCU 22 is coupled to the ADC 20. It is used to switch the capacitive sensors 10, decide the feedback negative capacitance and the gain value, and process all the capacitances of the capacitive sensors 10 to detect the touch position.

Figure 2:
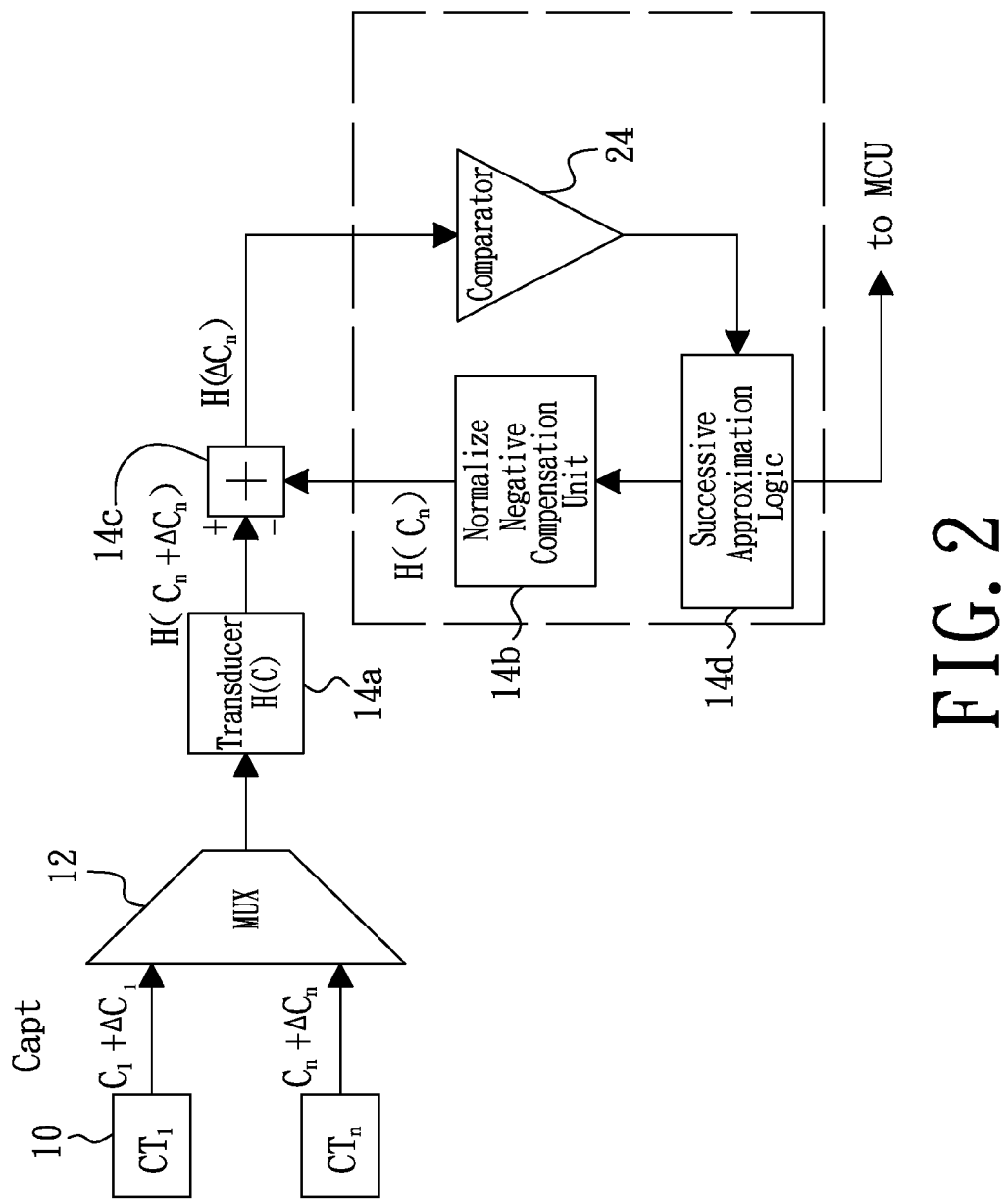
FIG. 2 is a signal flowing diagram when the touch position detector is acquiring the basic capacitances of the capacitive sensors.

Before detecting the touch position, the touch position detector of the capacitive touch panel must detect the basic capacitances of the capacitive sensor 10 to obtain the compensation parameter of the negative capacitance compensation unit 14. FIG. 2 is a signal flowing diagram when the touch position detector is acquiring the basic capacitances of the capacitive sensors 10. The negative capacitance compensation unit 14 further includes a successive approximation ADC 14d for acquiring a digital signal generated by the capacitive sensor 10 without touching. The normalized negative compensation unit 14b and a comparator 24 form a correction circuit.

Figure 3:
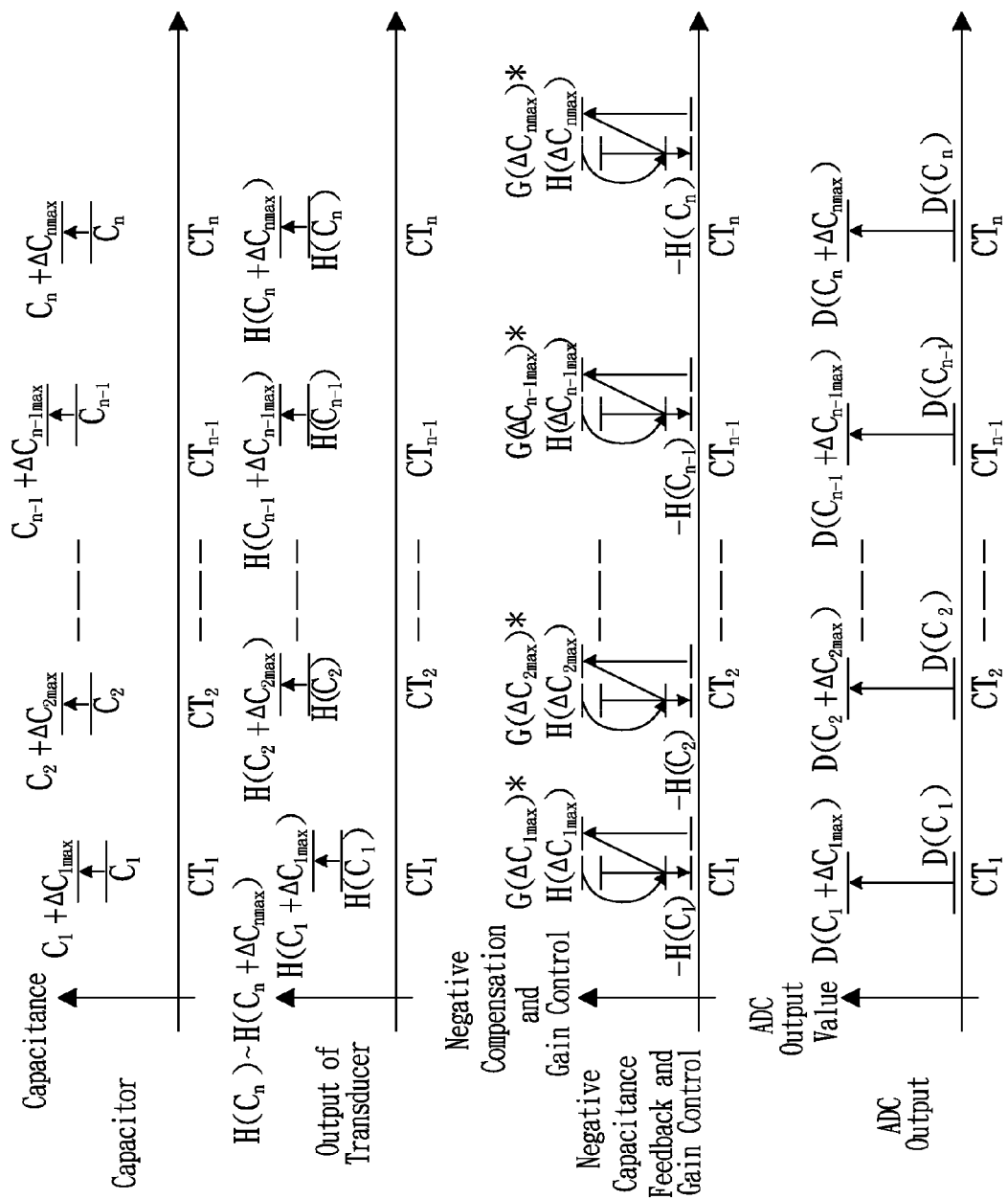
FIG. 3 is a signal diagram according to different points of FIG. 1

FIG. 3 is a signal diagram according to different points of FIG. 1. The first row denotes that each of the capacitive sensors $CT_n$ has a unique basic capacitance $C_n$ and a unique change $\Delta C_n$. The second row denotes that the transducer 14a outputs a measuring signal $H(C_n+\Delta C_n)$. The third row denotes that after passing through the negative capacitive compensation and the gain amplifying adjustment, the output signal of the signal amplifier 16 is $G(\Delta C_{nmax})*H(\Delta C_n)$. Both in the situation of largest change or without object touching, therefore, the signal amplifier 16 can control different capacitive sensing unit to achieve a considerable strength. The fourth row denotes that the ADC 20 outputs a digital signal $D(C_n+\Delta C_{nmax})$ that can be processed by the MCU 22.

Figure 4:
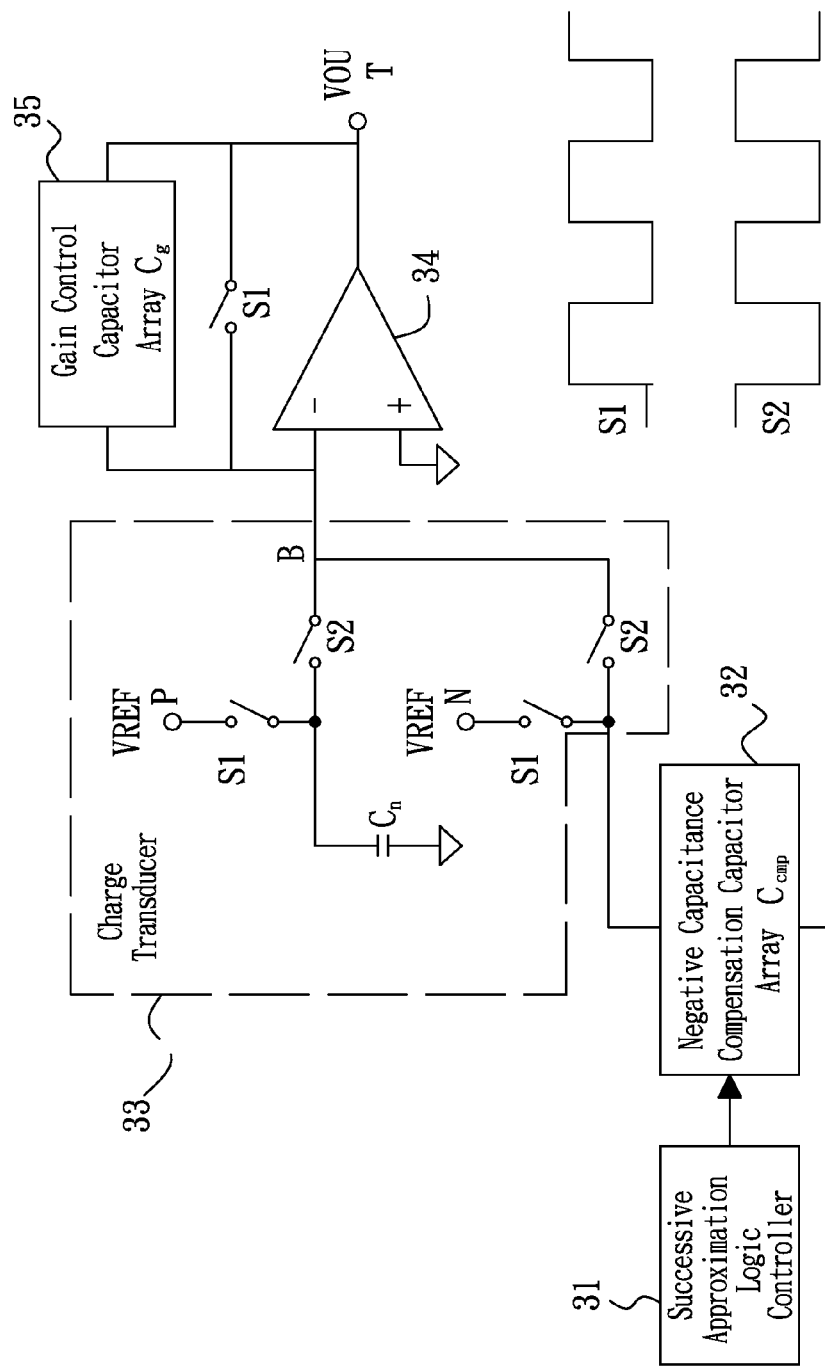
FIG. 4 is a detail circuit of the negative capacitance compensation unit.

FIG. 4 is a detail circuit of the negative capacitance compensation unit. The circuit can transform the capacitance values of the capacitive sensors 10 to values of electronic charge and has functions of negative compensation, gain control and an adder. The circuit includes a successive approximation ADC controller 31, a negative capacitance compensation capacitor array 32, a charge transducer 33, an amplifier 34, a gain control capacitor array 35, and switches S1 and switches S2. The negative capacitance compensation capacitor array 32 is coupled between the successive approximation ADC controller 31 and the charge transducer 33. The charge transducer 33 is further coupled to the negative input of the amplifier 34. The gain control capacitor array 35 is coupled between the output and negative input of the amplifier 34. The negative capacitance compensation capacitor array 32 equals to the normalized negative compensation unit 14b shown in FIG. 1. The successive approximation ADC controller 31 equals to the successive approximation ADC 14d shown in FIG. 2 for configuring the capacitance of the negative capacitance compensation capacitor array 32 according to the basic value of capacitance. The charge transducer 33 acts as the transducer 14a shown in FIG. 1. Reference voltages VREFN and VREFP are with the same amplitude but opposite polarity. When S1 is on, the capacitive sensor $C_n$ and the negative capacitance compensation capacitor $C_{cmp}$ are respectively charged in opposite polarity by VREFN and VREFP. When S1 is off and S2 is on, $C_n$ adds to $C_{cmp}$ at point B in the form of charge. The amplifier 34 equals to the signal amplifier 16 shown in FIG. 1. The gain control capacitor array 35 equals to the normalized signal amplitude gain controller 18 shown in FIG. 1.

The above circuit of the negative capacitance compensation unit 14 outputs a signal Vout and then Vout is converted to a digital signal $$ADOUT = \frac{C_n + \Delta C_n + C_{cmp}}{C_G} \bigg/ C_{LSB}$$

Wherein $C_{LSB}$ is a corresponding capacitance to the $I_{LSB}$ of ADC, $C_n$ is the basic capacitance, $\Delta C_n$ is the change of capacitance, $C_{cmp}$ is the compensation capacitance. When $C_{cmp}$ equals to $C_n$, the influence of the basic capacitance can be completely compensated.

Figure 5:
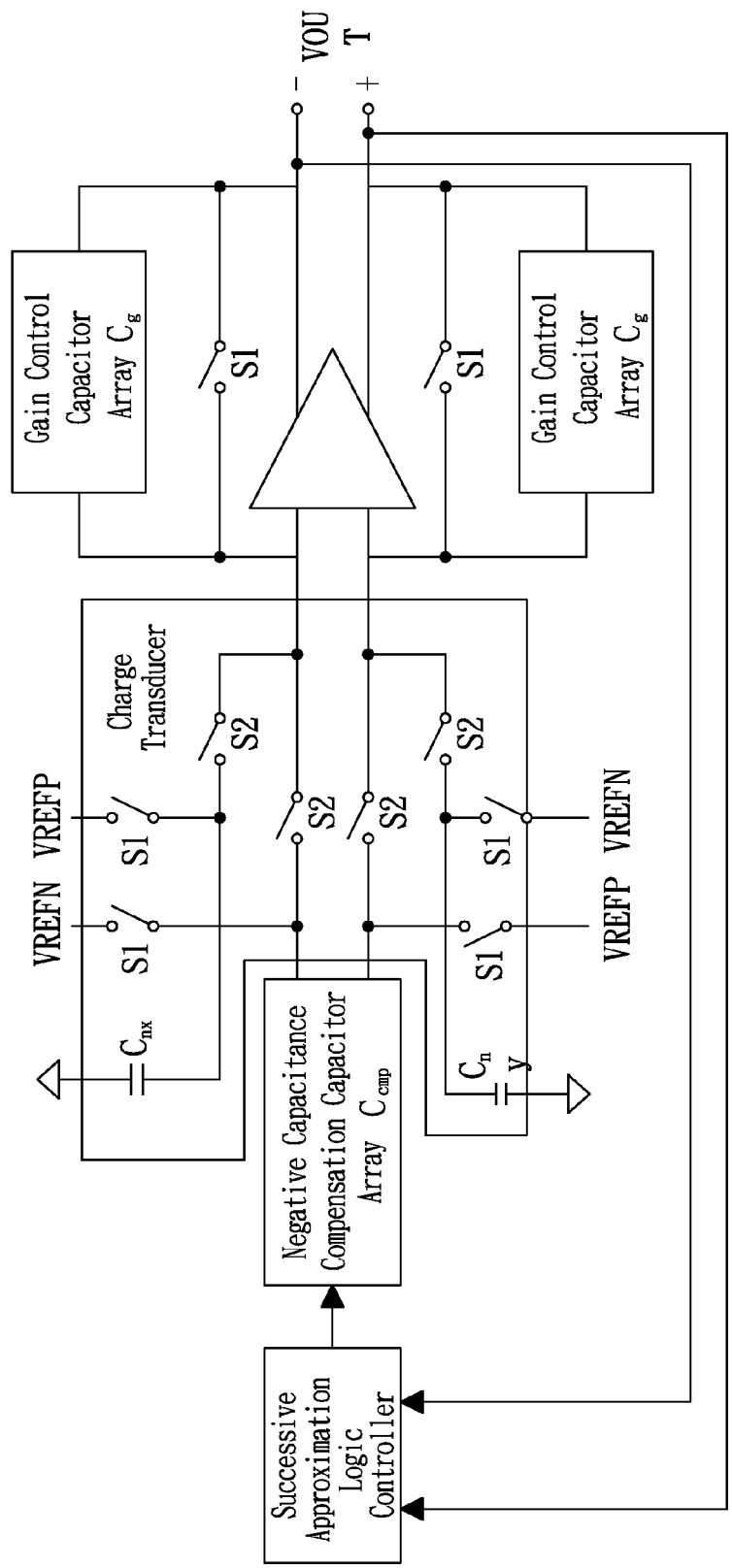
FIG. 5 is another detail circuit of the negative capacitance compensation unit.

FIG. 5 is a detail circuit of the negative capacitance compensation unit according to another embodiment. With different to the circuit of FIG. 4, the circuit of this embodiment uses a differential circuit to form the negative capacitance compensation unit 14 and it can compensate two capacitive sensors $C_{nx}$ and $C_{ny}$ simultaneously.

Figure 6:
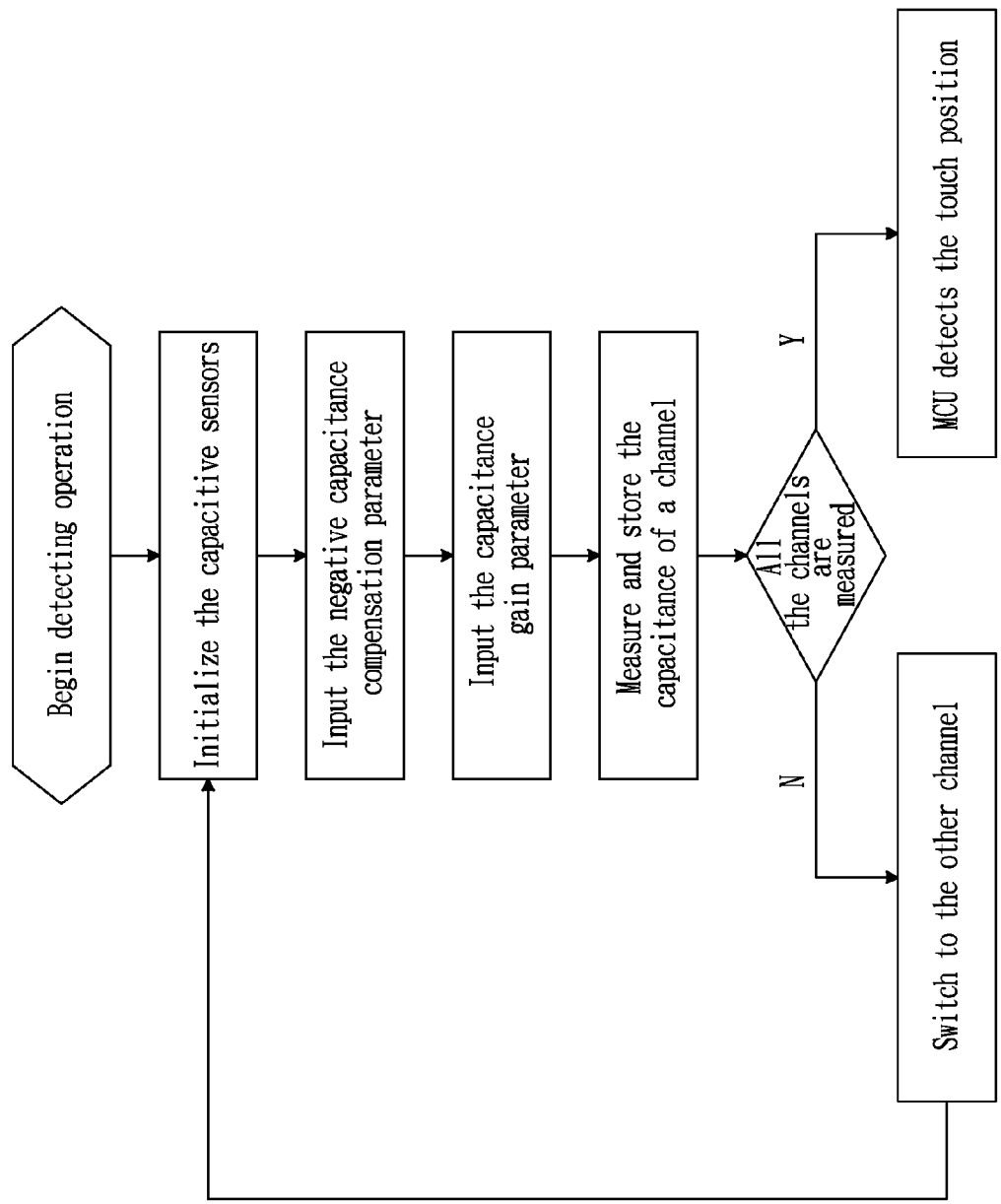
FIG. 6 is a flow chart of method for detecting the touch position of the present invention.

FIG. 6 is a flow chart of method for detecting the touch position of the present invention. Before detecting operation, the negative capacitance compensation parameter and the capacitance gain parameter are acquired for negative compensation and gain control. When starting to detect position, the first step is to initialize the capacitive sensors and then input values of the negative capacitance compensation parameter and the capacitance gain parameter. Sequentially, the capacitive sensors measure and store the capacitance of each channel. At last, the MCU 22 detects the touch position according to all the stored capacitances.

Figure 7:
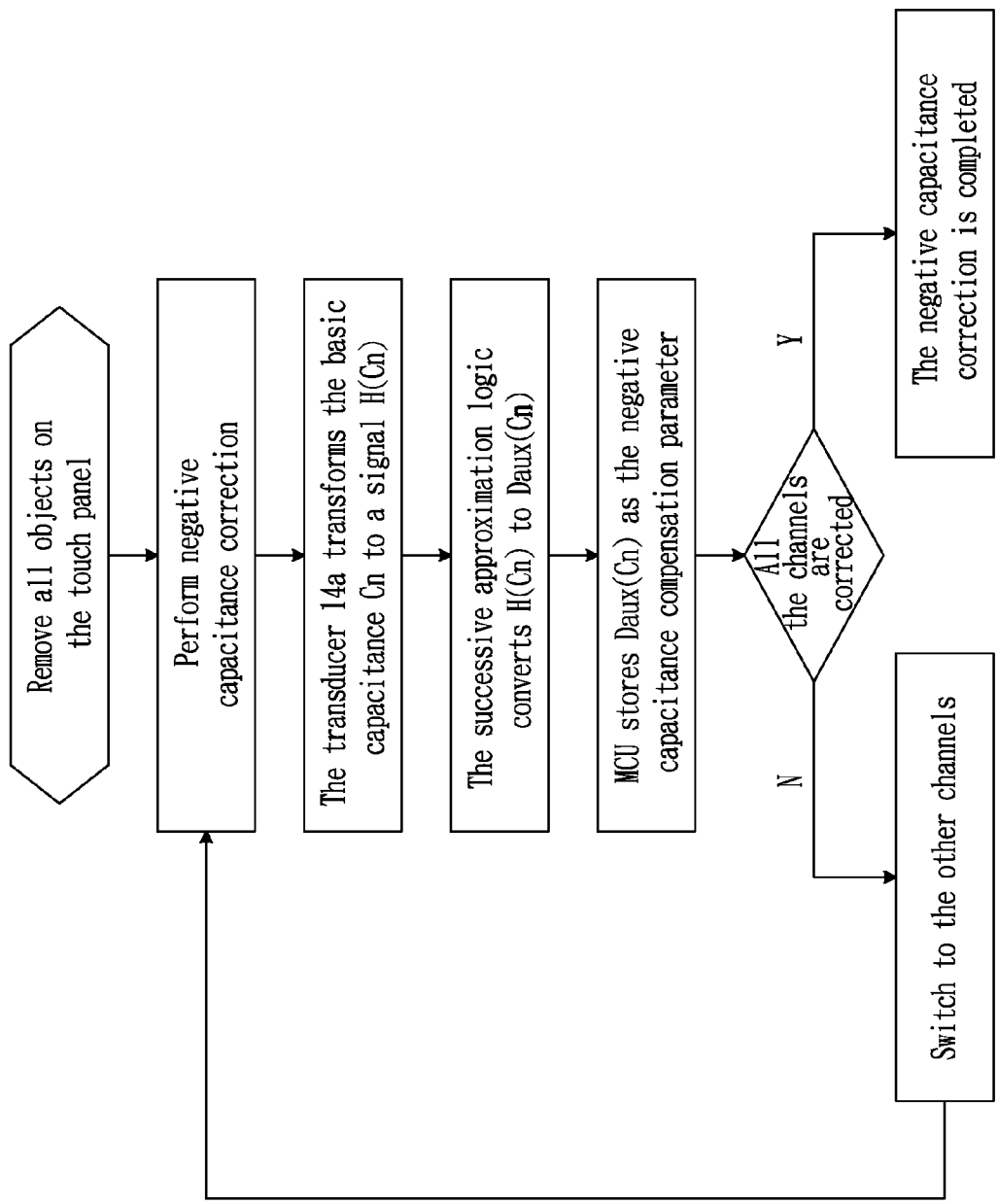
FIG. 7 is a flow chart of a method for obtaining the negative capacitance compensation parameter according to the present invention.

FIG. 7 is a flow chart of a method for obtaining the negative capacitance compensation parameter according to the present invention. Please refer to the FIG. 1 as well. Before initiation, the touch panel is processed by negative capacitive compensation and acquires signal from every capacitive sensing unit. Firstly, remove all objects, such as a finger, on the touch panel and perform negative capacitance correction for a channel. Then the transducer 14a transforms the basic capacitance Cn to a signal H(Cn), and the successive approximation ADC 14d accepts H(Cn) and converts it to Daux(Cn). Sequentially, the MCU 22 calculates and stores the channel capacitance to switch the touch panel channel and then perform negative capacitance correction to the next channel until all the channels are completed the correction. So the negative capacitance compensation parameters of all the channels can be obtained.

Figure 8:
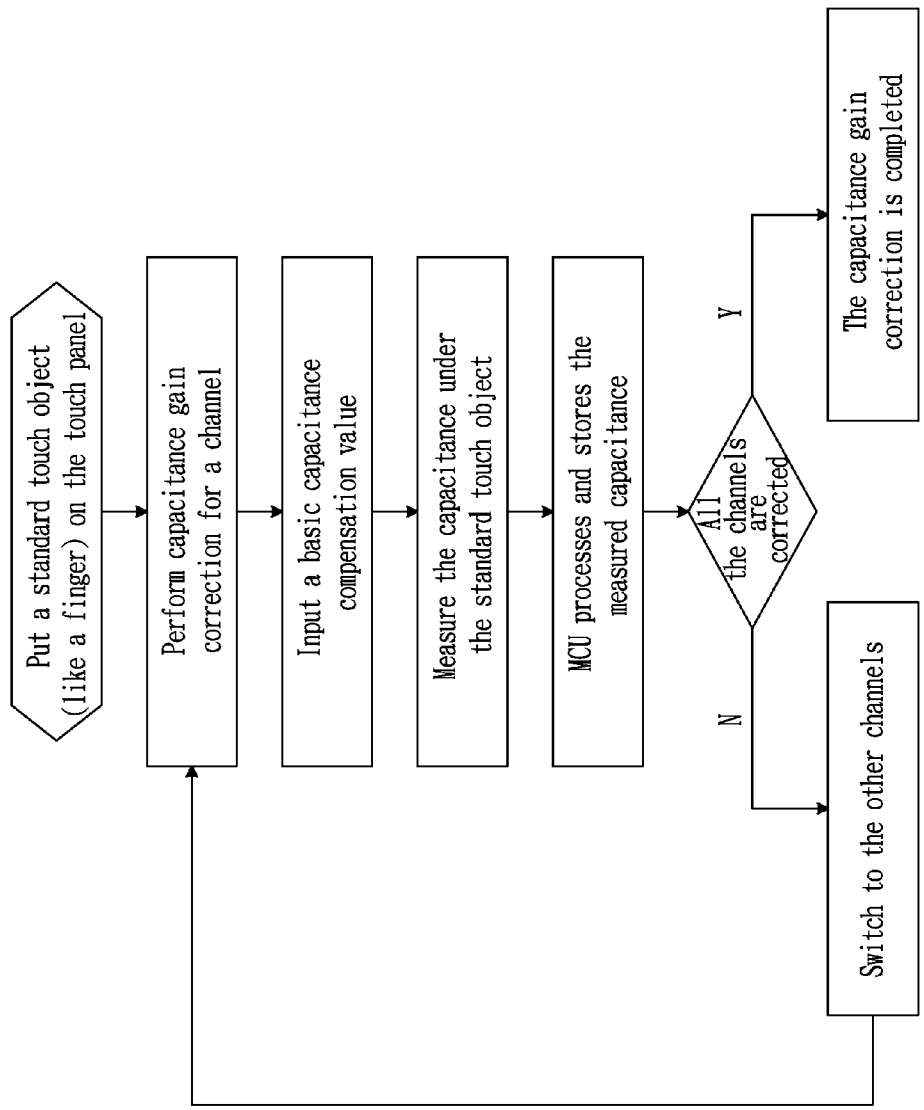
FIG. 8 is a flow chart of a method for obtaining the capacitance gain parameter according to the present invention.

FIG. 8 is a flow chart of a method for obtaining the capacitance gain parameter according to the present invention. When performing the gain correction of the amount of capacitive sensing, a corresponding gain amount of every capacitive sensing unit is acquired under the largest standard loading. Firstly, put a standard touch object, such as a finger, on the touch panel and perform capacitance gain correction for a channel; then input a basic capacitance compensation value to compensate the basic capacitance; and then measure the capacitance under the standard loading; sequentially, the MCU 22 processes and stores the measured capacitance of this channel. At last, switch the channel of touch panel and perform the gain correction of capacitive sensing value of the next channel until all the channels are completed the correction.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A touch position detector of a capacitive touch panel, comprising:
    a plurality of capacitive sensors for sensing a touch object;
    a negative capacitance compensation unit coupled to the capacitive sensors, for compensating a basic capacitance of the capacitive sensors and obtaining a change of capacitance;
    an analog/digital converter (ADC) coupled to the negative capacitance compensation unit, for converting the change of capacitance to a digital signal; and
    a micro controller unit coupled to the ADC, for detecting a position of the touch object according to the change of capacitance;
    wherein the negative capacitance compensation unit comprises:
    a transducer for converting the sensing capacitance to a measuring signal;
    a normalized negative compensation unit for generating a corresponding feedback signal according to the basic capacitance of the capacitive sensors; and
    an adder for summing the measuring signal and the feedback signal to obtain the change of capacitance of the capacitive sensors.

2. The touch position detector of claim 1, further comprising a multiplexer coupled between the sensors and the ADC.

3. The touch position detector of claim 1, wherein the negative capacitance compensation unit further comprising a successive approximation ADC coupled to the normalized negative compensation unit, for getting the basic capacitance without touching.

4. The touch position detector of claim 1, further comprising a signal amplifier coupled to the negative capacitance compensation unit, for amplifying the output signal of the negative capacitance compensation unit.

5. The touch position detector of claim 4, further comprising a normalized signal amplitude gain controller coupled between the signal amplifier and the micro controller unit, for generating a corresponding feedback signal to a largest signal strength from loading object.

6. A method for detecting a touch position of a touch panel, comprising:
    setting an initial value for a capacitive sensor;
    inputting a capacitance gain parameter of a channel;
    measuring a capacitance of the channel;
    generating a feedback signal according to a negative capacitance compensation parameter;
    summing the capacitance of the channel and the feedback signal to obtain a change of capacitance of the channel;
    detecting a touch position according to the change of capacitance of the channel; and
    acquiring the negative capacitance compensation parameter before setting the initial value for the capacitive sensor, wherein the process comprises:
    sensing a basic capacitance signal of the channel;
    reading the basic capacitance signal; and
    processing the basic capacitance signal to get the negative capacitance compensation parameter of the channel and storing the negative capacitance compensation parameter.

7. The method for detecting a touch position of claim 6, further comprising acquiring the capacitance gain parameter before setting the initial value for the capacitive sensor, wherein the process comprises:
    inputting a basic capacitance compensation value of the channel;
    measuring the capacitance of the capacitive sensor when a standard object is touching on the position of the capacitive sensor; and
    processing the capacitance of the capacitive sensor to generate the capacitance gain parameter.

* * * * *